United States Patent
Peloza

[15] 3,666,697

[45] May 30, 1972

[54] METHOD FOR PRODUCING SHAPED PLASTIC ARTICLES

[72] Inventor: Casimir C. Peloza, Rosemount, Minn.

[73] Assignee: Ashland Oil Inc., Houston, Tex.

[22] Filed: Mar. 11, 1970

[21] Appl. No.: 18,765

[52] U.S. Cl. .................260/22 CB, 260/2.5 N, 260/22 R, 260/29.2 E, 260/29.2 UA, 260/29.6 WQ, 260/32.6 R, 264/300
[51] Int. Cl. .................C08f 21/04, C08g 17/16
[58] Field of Search .................260/2.5 N, 29.2 E, 29.6 WQ, 260/22 CB, 29.2 U, 22 M, 22 R; 264/300

[56] References Cited

UNITED STATES PATENTS

| | | | |
|---|---|---|---|
| 2,843,556 | 7/1958 | Moorman | 260/28.5 |
| 3,140,268 | 7/1964 | Halpern et al. | 260/23 |
| 3,227,665 | 1/1966 | Fourcade et al. | 260/2.5 |
| 3,256,219 | 6/1966 | Will | 260/2.5 |
| 3,461,087 | 8/1969 | Pritchard | 260/2.5 |
| 3,516,957 | 6/1970 | Gray et al. | 260/22 |

FOREIGN PATENTS OR APPLICATIONS

| | | | |
|---|---|---|---|
| 584,467 | 10/1959 | Canada | 260/864 |

OTHER PUBLICATIONS

The Condensed Chemical Dictionary, Fifth Edition, Reinhold Publishing Corporation, New York, 1956, page 1030.

*Primary Examiner*—Donald E. Czaja
*Assistant Examiner*—Ronald W. Griffin
*Attorney*—Walter H. Schneider and William Kammerer

[57] ABSTRACT

A method is disclosed for producing shaped plastic articles in the form of a solid water-in-oil emulsion wherein the water phase exists as discrete colloidal-size water droplets dispersed in a continuous oil phase consisting of the thermoset polymerization product of an essentially linear unsaturated polyester and a vinyl monomer. The foremost utility of the disclosed method is that it provides shaped articles whose surfaces are substantially free of irregularities in the nature of pimples.

13 Claims, No Drawings

METHOD FOR PRODUCING SHAPED PLASTIC ARTICLES

BACKGROUND OF THE INVENTION

1. Field of the Invention

This invention relates to a method for producing shaped plastic articles from water-in-oil emulsions in which the continuous oil phase is a thermosetting polyester resinous composition.

2. Description of the Prior Art

Thermosetting polyester resinous compositions, i.e., solutions of an essentially linear unsaturated polyester in a vinyl monomeric cross-linking agent have heretofore been extensively utilized to prepare molded or cast thermoset articles exhibiting excellent chemical resistance and mechanical strength properties. Molded composites wherein a thermoset resin of the foregoing type serves as a matrix for a filler component added to reduce cost and at the same time to enhance mechanical strength properties have found widespread use in the fabrication of such diverse structures as auto bodies, boat hulls, printed electrical circuit boards, fishing rods, gears, countertops and the like.

A comparatively recent development of importance in this area of resin technology resided in the discovery of a way to effect the polymerization of a water-in-oil emulsion wherein the oil phase constitutes a thermosetting polyester resinous composition without causing the emulsion to invert to a oil-in-water system. Such method is disclosed and claimed in U.S. Pat. No. 3,256,219.

As taught in the referred-to patent, one can realize, depending upon the particular interfacial surface tension conditions existing between the various components of the water-in-oil emulsion, polymerized products which are either predominately of open-cell structure or of predominately closed-cell structure. Since the practice of the present invention has particular applicability with respect to the production of composites of the latter type, further discussion of the prior art will accordingly be presented solely in this light.

The closed-cell structures resulting from polymerization of water-in-oil emulsions as aforesaid are essentially solid emulsions in which discrete water droplets of a size estimated to be in the order of from 1–50 microns remain dispersed throughout a continuous phase of the thermoset polyester resinous composition. The resultant solid emulsions, notwithstanding their substantial water contents, exhibit good mechanical strength properties and for this reason have enjoyed widespread acceptance for the fabrication of shaped articles where a high degree of load bearing capability, high impact resistance or flexural strength does not represent an essential requirement in the use of the article. Examples of such uses notably include wood substitutes for the fabrication of furniture, furniture parts, cabinet components, picture frames and the like. Still other types of articles in which the thermoset water-in-oil emulsions can be employed to produce are lamp bases, statuary objects, objets d'art, etc.

As indicated, the dispersed phase of the closed-cell composites prepared from emulsions to which this invention relates is of the predominately non-communicating type. Nonetheless, because of the minor extent to which intercommunication of the dispersed phase could exist, coupled with the diffusive characteristics of the encapsulating phase, slow but progressive loss of water is ordinarily experienced in the course of time. Loss of water in such a manner leads to a dimensional change in the form of shrinkage. While shrinkage is obviously undesirable in the preparation of shaped articles from the instant emulsions, it is not, however, a severe problem since the degree of change normally encountered can be tolerated or reduced to a tolerable limit in many applications or it can even be substantially obviated in other applications by coating a shaped article with a non-porous surface coating. Besides shrinkage, however, the closed-cell structure gives rise to an accompanying problem which cannot be effectively coped with. This problem manifests itself as surface imperfections in the form of pimpling. Hitherto, no effective way has been devised for controlling, much less obviating, the development of pimples on the surface of the cured composition.

OBJECT

The principal objective of this invention, therefore, is to provide a method for producing from water-in-oil emulsions of the aforesaid type thermoset shaped articles whose surfaces are substantially free of surface imperfections in the form of pimpling.

SUMMARY OF THE INVENTION

In accordance with this invention, a method is provided for preparing shaped plastic articles from a water-in-oil emulsion wherein the oil phase is a thermosetting polyester resinous composition which comprises incorporating into said emulsion as an adjuvant, a material selected from the group consisting of a $C_{12}$–$C_{24}$ fatty amide, a $C_{12}$–$C_{24}$ fatty acid and a water-insoluble metal soap of a $C_{12}$–$C_{24}$ fatty acid and thereupon effecting cure of the continuous oil phase to a thermoset condition without breaking the dispersed nature of the emulsion.

The practice of the process of this invention permits the obtainment of thermoset shaped plastic articles whose surfaces are substantially free of irregularities in the form of pimples which invariably develop to some degree or another and usually to a very objectionable degree in curing the aforesaid water-in-oil emulsions in accordance with prior art practices.

DESCRIPTION OF THE PREFERRED EMBODIMENTS

The polyester component of the thermosetting polyester resinous compositions useful in the practice of this invention are those obtained by esterifying a carboxylic acid with a glycol and consequently are essentially linear polymers. In order to have a condensate which is capable of reacting with and thus cross-linking through a vinyl monomer to provide a thermoset product, the polyester must contain polymerizable unsaturation. Such unsaturation can be imparted by employing an $\alpha,\beta$-ethylenically unsaturated diacid either alone or in combination with a saturated diacid in the preparation thereof. Applicable unsaturated acids for this purpose include maleic, fumaric, itaconic and the like. Maleic acid or the anhydride thereof is generally the preferred unsaturated acid. As indicated, saturated dicarboxylic acids can also be used in preparing suitably reactive polyesters, as such type acids lend flexibility and other desirable properties to the cross-linked products thereof. While any of the saturated diacids are applicable, the aromatic dicarboxylic acids and especially the phthalic acids are preferred. Representative of the phthalic acids are such as o-phthalic or the anhydride thereof, iso-phthalic, tere-phthalic, tetrachlorophthalic and the like. The ratio of unsaturated diacid to saturated diacid utilized in preparing the polyester can vary extensively, as for example, from about 4:1 to 1:4, on a molar basis, respectively.

As mentioned above, the dicarboxylic acid component is esterified with a glycol to yield the desired condensate. A plurality of glycols can be used for this purpose although ethylene glycol, propylene glycol and the corresponding ether glycols are preferred. In preparing the condensate, a stoichiometrical amount of the glycol or excesses thereof ranging up to about 10 percent over the stoichiometric requirement can be employed. The resultant polyesters, depending upon the particular excess of glycol, if any, used, the type of saturated diacid employed, etc., exhibit a molecular weight of from about 1,000 to 10,000. More commonly, however, the polyester component of thermosetting resinous compositions have a molecular weight of from about 1,500 to 50,000. Molecular weight determination is customarily accomplished by end-group analysis.

The thermosetting polyester resinous compositions useful in the practice of this invention are, as indicated previously, solutions of a reactive polyester as aforedescribed in a vinyl monomer. Suitable vinyl monomers include the vinyl aromatics; e.g., styrene, vinyl toluene, α-methylstyrene, α-chlorostyrene, divinyl benzene, etc. Other vinyl monomers such as the lower acrylates, methacrylates, as well as vinyl acetate, the lower vinyl ethers and acrylonitrile likewise represent applicable cross-linking agents for the unsaturated polyesters. The preferred vinyl monomers are the vinyl aromatics and particularly styrene. The unsaturated polyester and the vinyl monomer can be combined over a wide range of weight ratios as, for example, from 1:9 to 9:1, respectively. The preferred compositions are those containing from about 35 to 65 parts by weight polyester and correspondingly from about 65 to 35 parts of styrene.

To facilitate the formation of the water-in-oil emulsion system and to maintain the requisite stability thereof during the course of polymerizing the oil phase in obtaining a thermoset product, the use of an added emulsifier is generally observed. A number of emulsifying agents are applicable for this purpose. Among such suitable agents there are the polymeric types disclosed in U.S. Pat. No. 3,256,219, namely, the essentially hydrophobic polymerization products including polycondensates containing a quantum of hydrophilic groups capable of imparting a requisite degree of interfacial surface tension between the oil and aqueous phases, all as described in said patent. Representative of the functional groups capable of imparting a requisite degree of hydrophilic characteristics to the polymeric agent are such as carboxyl, carboxylate, carboxamide, hydroxyl, ether, amino, ammonium, sulfonic, sulfonate and sulfoxide groups. A specific example of the foregoing type of emulsifier is a copolymerization product of acrylic acid and styrene having a molecular weight in the range of 20,000 to 200,000 and an acid number in the order of about 10. Further examples of applicable polymeric emulsifying agents include the polymerization and copolymerization products of methylmethacrylate and vinyl acetate prepared by emulsion polymerization in the presence of a persulfate. Still other suitable emulsifiers include the lipophilic type agents as exemplified by the class of nonionic polyhydric-fatty acid esters. An enumeration of such esters include sorbitan sesquioleate, sorbitan mono-stearate, sorbitan mono-oleate, propylene glycol monolaurate, glycerol mono-stearate, diethylene mono-oleate, etc.

The cure of a polyester resinous composition is ordinarily achieved through the use of a free radical generating catalyst. The effectiveness of a free radical catalyst for this purpose can be markedly enhanced through the use of promoter or activator systems in the curing process. Although the presence of a promoter system importantly reduces the time and temperature required for effecting the cure, it also materially aids in securing a proper cure. It has been found that certain promoter systems not only are activators in the foregoing sense but also serve a dual purpose as a stabilizer for water-in-oil emulsions obtained without resorting to the use of an intentionally added emulsifying agent of the type referred to above. Moreover, the stability of the resultant emulsions is such that the oil phase can be cured without breaking the dispersed nature of the water-in-oil emulsion. Because of this feature of the contemplated promoters, they are preferred in obtaining stable water-in-oil emulsions in accordance with this invention.

The promoter systems capable of imparting a requisite degree of emulsification stability as aforesaid include the combinations of active cobalt metal in the form of an oil-soluble compound and a tertiary amine having at least one aryl group. Oil-soluble active cobalt containing compounds are exemplified by the various commercial grades of cobalt naphthenate and octoate used extensively as driers or catalyzers for surface coating resins which cure via an oxidation process. Particularly representative of the tertiary amines which can be used in conjunction with the cobalt salt are diethylaniline, dimethylaniline, and p-N, N' dimethyl toluidine. For the purpose of achieving both stable emulsification and promotion, the cobalt salt is employed in an amount so as to provide from about 0.03 to 0.4 percent of active cobalt metal based on the weight of the polyester resinous combination. The tertiary amine used in conjunction with the cobalt salt; e.g., dimethyl aniline, can be used in an amount from about 0.1 to 1.0 percent based on the weight of the polyester resinous composition.

As a free radical generating catalyst, a variety of compounds can be utilized. While the organic peroxides are preferred, other free radical generating compounds such as the azonitriles are applicable. The preferred catalyst, namely, an organic peroxide, is desirably a liquid which is either soluble of dispersible in water or soluble in the oil phase. Specific examples of such peroxides include hydrogen peroxide, methyl ethyl ketone peroxide, benzoyl peroxide, di-t-butyl peroxide, t-butyl hydroperoxide, isopropyl peroxidicarbonate, lauroyl peroxide, t-butyl perbenzoate, cumene hydroperoxide, di-cumyl peroxide, cyclohexyl hydroperoxide and the like. When utilizing the preferred emulsifying agent in accordance with this invention; vis., the afore-described promoter systems, it is likewise preferred to use a water dispersible peroxide type catalyst. Particularly representative of the latter is methyl ethyl ketone peroxide. The amount of peroxide catalyst that can be employed is generally in the range from about 0.1 to 3 percent and more preferably from about 0.3 to 1 percent based on the weight of the oil phase of the emulsion.

As pointed out hereinabove, the gist of the present invention resides in the inclusion within water-in-oil emulsions of the type concerned of an adjuvant capable of substantially obviating the development of surface irregularities in the form of pimpling occuring upon converting the oil phase to a thermoset condition. Broadly, such adjuvants include the saturated fatty amides, the saturated fatty acids and water-insoluble metal soaps thereof having from 12 to 24 carbon atoms in the acyl moiety. An enumeration of the more commonly available fatty acids of the foregoing type are such as lauric, myristic, palmitic, margaric stearic, arachidic, behenic and carnaubic. As indicated, the corresponding amides are applicable. Likewise, the water-insoluble metal soaps of a $C_{12}$–$C_{24}$ fatty acid wherein the metal is a Group II or III metal are suitable in the practice of this invention. Of such soaps, however, the calcium, aluminum and particularly the zinc soaps are preferred.

The amount of adjuvant capable of realizing the objective of this invention varies depending upon the type of unsaturated polyester employed as well as the specific type of promoter-catalyst combination used and the amount thereof employed. Generally, a suitable amount of the adjuvant is within the range of from about 0.1 to 10 percent based upon the weight of the oil phase. However, in the use of the preferred unsaturated polyesters and/or the preferred promoter-catalyst systems, an applicable amount of the adjuvant is from about 0.5 to 1.5 percent on the aforementioned basis.

The formation of the water-in-oil emulsions and subsequent curing of same to provide the thermostat product thereof can be carried out two general ways. One way particularly suited for small scale production purposes consists of stirring the polyester resinous composition containing an emulsifying agent or a promoter-accelerator system as aforedescribed using a high speed stirrer and thereupon adding the water slowly to yield a creamy emulsion and thereafter adding the peroxide catalyst to the emulsion. After a few minutes following the addition of the catalyst, the emulsion will commence to set up as a solid. However, sufficient time is allotted for casting the emulsion before the emulsion solidifies. The second procedure which is adapted for fast and continuous production of cast articles consists of simultaneously pumping the polyester resinous composition containing the emulsifier and/or promoter system and water containing catalyst through a continuous dispensing machine. In either mode of operation it is essential that the water be added to the oil phase rather than the reverse procedure. The adjuvant utilized in the practice of this invention can be incorporated into the water-in-oil emulsion in either of the foregoing general methods by employing a suspension thereof in either the polyester resinous composition or the water. The manner of incorporating the adjuvant as a suspension thereof in the polyester resinous composition is preferred. In preparing the emulsion, the amount of water is from about 40 to 80 percent by weight and more preferably from 50 to 70 percent by weight based on the total weight of the emulsion; i.e., the combined weight of the dispersed water and the thermosetting resinous composition.

The following example is illustrative of the best mode contemplated for carrying out the present invention. As indicated, this example is given primarily by way of illustration and, accordingly, any enumeration of details set forth therein is not to be construed as limiting the invention except as such limitations are expressed in the appendant claims. All parts are parts by weight except where otherwise stated.

EXAMPLE I

Two types of polyester resinous compositions were utilized in preparing the emulsions of this example. Details concerning the composition of the resin components are as follows:

Resin A

An unsaturated polyester was prepared by esterifying one mole of maleic anhydride, two moles of isophthalic acid and three moles of diethylene glycol. Substantially complete esterification was carried out following a conventional method for effecting the condensation reaction. The acid number of the resultant product was about 10.

One part of the polyester resin was dissolved in 1 ½ parts of styrene.

RESIN B

In a similar manner, a polyester resin was prepared from 1 mole of maleic anhydride, 1 mole of isophthalic acid and 2 moles of propylene glycol.

One part of the esterification product was combined with three parts of Resin A. One part of the resultant resin mixture was dissolved in 1 ½ parts of styrene.

Resins A and B were combined with a promoter system comprising a mixture of cobalt octoate (12 percent Co) and dimethylaniline. A plurality of water-in-oil emulsions were prepared from the promoted resins by simultaneously pumping the resin and water together through a continuous dispensing machine. The weight ratio of polyester resinous composition to water was 50:50 in each instance. The polymerization catalyst employed in the respective tests was a water-dispersible MEK type peroxide (Lupersol DSW—Wallace & Tiernan & C0.) and thus incorporated as a dispersion thereof in the aqueous component of the emulsion per the preferred procedure as previously noted. Where employed, the adjuvant was introduced into the emulsion as a suspension thereof in the promoted resin. In preparing one test emulsion, however, the adjuvant was incorporated as a suspension thereof in the aqueous phase. Details concerning the nature of the promoter system used in the various test emulsions and the cure characteristics noted therefor are set forth in the following Table I. An arbitrary scale was employed in rating the appearance of the surfaces of the cured emulsions after one month with "4" indicating extensive pimpling and "1" indicating that the surfaces of the cured product were substantially free of pimples.

What is claimed is:

1. In a method for producing shaped plastic articles from a water-in-oil emulsion wherein a stable water-in-oil emulsion containing a thermosetting polyester resinous composition as the oil phase is first formed, whereupon the oil phase is then polymerized without breaking the dispersed nature of the emulsion to provide a solid water-in-oil emulsion in which the water phase essentially exists as discrete droplets dispersed throughout the thermoset product of the polyester resinous composition; the improvement of incorporating into said first-named emulsion a surface irregularity inhibiting amount of an adjuvant selected from the group consisting of a saturated $C_{12}$–$C_{24}$ fatty acid and a water-insoluble metal soap of a saturated $C_{12}$–$C_{24}$ fatty acid.

2. The improvement in accordance with claim 1 wherein said adjuvant is incorporated in the amount of from about 0.1 to 10 percent based on the weight of the oil phase.

3. The improvement in accordance with claim 2 wherein said adjuvant is incorporated in the form of a dispersion thereof in the oil phase.

4. The improvement in accordance with claim 3 wherein said adjuvant is incorporated in the amount of from about 0.5 to 1.5 percent based on the weight of the oil phase.

5. The improvement in accordance with claim 4 wherein said adjuvant is the aluminum, calcium, or zinc soap of the fatty acid.

6. The improvement in accordance with claim 5 wherein said adjuvant is the zinc soap.

7. The improvement in accordance with claim 6 wherein said soap is zinc stearate.

8. A method for producing shaped plastic articles which comprises:
  1. forming a stable water-in-oil emulsion composed of
    a. from about 40 to 80 parts by weight of a polyester resinous composition containing an oil-soluble cobalt compound in an amount so as to provide from about 0.03 to 0.4 percent by weight of active cobalt metal and from about 0.1 to 1.0 percent by weight of a tertiary amine having at least one N-aryl substituent,
    b. correspondingly from 60 to 20 parts by weight water, and
    c. from about 0.1 to 10 percent by weight based on the weight of (a) of an adjuvant selected from the group consisting of a saturated $C_{12}$–$C_{24}$ fatty acid and a water-insoluble metal soap of a saturated $C_{12}$–$C_{24}$ fatty acid,
  2. concurrently shaping the emulsion of step (1) and catalytically effecting the cure of component (a) thereof with an organic peroxide without breaking the dispersed nature of the emulsion.

9. A method in accordance with claim 8 wherein said polyester resinous composition consists essentially of from

TABLE I

| Emulsion No. | Resin | Promoter | Catalyst, percent based on resin | Adjuvant | Percent adjuvant based on emul. wt. | GT'/GT, ° F. | GPE' | PE, ° F. | 35 Shore hard., time | Pimple rating |
|---|---|---|---|---|---|---|---|---|---|---|
| 1 | A | A | 0.5 | | | 3.1/83 | 13.0 | 206 | 8.7' | 2 |
| 2 | A | A | 1.0 | | | 3.6/78 | 15.3 | 204 | 13.0' | 4 |
| 3 | A | B | 0.5 | Zn stearate | 1.0 | 3.2/80 | 13.0 | 195 | 12.0' | 1 |
| 4 | A | B | 1.0 | do | 1.0 | 3.6/79 | 16.0 | 200 | 15.0' | 1 |
| 5 | B | A | 0.5 | | | 2.5/80 | 10.4 | 199 | 5.0' | 3 |
| 6 | B | A | 1.0 | | | 2.0/85 | 9.0 | 208 | 6.0' | 2-3 |
| 7 | B | B | 0.5 | Zn stearate | 1.0 | 2.4/82 | 12.0 | 199 | 6.0' | 1 |
| 8 | B | B | 1.0 | do | 1.0 | 2.4/80 | 10.1 | 200 | 7.3' | 1 |
| 9 | A | A | 0.5 | do | 1.0 | 3.2/80 | 14.0 | 177 | 13.0' | 1 |
| 10 | A | A | 0.5 | Stearic acid | 1.0 | 3.5/79 | 14.0 | 172 | 12.2' | 1 |

*Zn stearate incorporated in emulsion as suspension in water.
Promoter A: 1.25% Co octoate (12% Co) – 0.5 dimethyl aniline based on resin.
Promoter B: 1.0% Co octoate (12% Co) – 0.5 dimethyl aniline based on resin.
GT'/GT, ° F.: Time (min.) to gel/temp. (° F.) at gell point.
GPE': Time (min.) to peak exotherm.
PE, ° F.: Temp. (° F.) at peak exotherm.
35 Shore hardness – time (min.) to a demold hardness of 55 Shore.

about 35 to 65 parts by weight of an ethylenically unsaturated polyester and correspondingly from 65 to 35 parts by weight styrene and wherein the weight ratio of (a) to (b) is from 30:70 to 50:50, respectively.

10. A method in accordance with claim 9 wherein said adjuvant is present in the amount of from about 0.5 to 1.5 percent based on the weight of said component (a).

11. A method in accordance with claim 10 wherein said adjuvant is the aluminum, calcium or zinc soap of the fatty acid.

12. A method in accordance with claim 11 wherein said adjuvant is the zinc soap.

13. A method in accordance with claim 12 wherein said soap is zinc stearate.

* * * * *

UNITED STATES PATENT OFFICE
CERTIFICATE OF CORRECTION

Patent No. 3,666,697　　　　　　　　Dated　May 30, 1972

Inventor(s) Casimir C. Peloza

It is certified that error appears in the above-identified patent and that said Letters Patent are hereby corrected as shown below:

Column 2, line 71, "50,000" should read --5,000--.

Column 4, line 3, "combination" should read --composition--.

Column 5, last line of footnote below Table I, "55 Shore" should read --35 Shore--.

Claim 8, line 4, change "40 to 80" to --60 to 20--.

line 10, change "60 to 20" to --40 to 80--.

Signed and sealed this 27th day of November 1973.

(SEAL)
Attest:

EDWARD M. FLETCHER, JR.　　　　　RENE D. TEGTMEYER
Attesting Officer　　　　　　　　Acting Commissioner of Patents